US012346964B2

(12) United States Patent
Pierce et al.

(10) Patent No.: US 12,346,964 B2
(45) Date of Patent: *Jul. 1, 2025

(54) SYSTEM FOR PHYSICALLY DELIVERING VIRTUAL CURRENCIES

(71) Applicant: Chicago Mercantile Exchange Inc., Chicago, IL (US)

(72) Inventors: Ryan Pierce, Chicago, IL (US); Sandra Ro, London (GB); Mansoor Ahmed, Naperville, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 463 days.

This patent is subject to a terminal disclaimer.

(21) Appl. No.: 17/973,625

(22) Filed: Oct. 26, 2022

(65) Prior Publication Data

US 2023/0043871 A1   Feb. 9, 2023

Related U.S. Application Data

(63) Continuation of application No. 16/679,610, filed on Nov. 11, 2019, now Pat. No. 11,514,522, which is a continuation of application No. 14/932,374, filed on Nov. 4, 2015, now Pat. No. 10,504,178.

(51) Int. Cl.
*G06Q 40/04* (2012.01)
(52) U.S. Cl.
CPC .................... *G06Q 40/04* (2013.01)
(58) Field of Classification Search
CPC ........ G06Q 40/00; G06Q 40/04; G06Q 40/06; G06Q 30/00; G06Q 30/06; G06Q 30/08
USPC .................................................... 705/35–37
See application file for complete search history.

(56) References Cited

U.S. PATENT DOCUMENTS

| | | |
|---|---|---|
| 2013/0166455 A1 | 6/2013 | Feigelson |
| 2013/0282580 A1 | 10/2013 | O'brien |
| 2014/0164251 A1 | 6/2014 | Loh |
| 2016/0140653 A1 | 5/2016 | Mckenzie |
| 2016/0321435 A1 | 11/2016 | Mccoy |
| 2016/0323109 A1 | 11/2016 | Mccoy |
| 2016/0330031 A1 | 11/2016 | Drego |
| 2016/0335628 A1 | 11/2016 | Weigold |
| 2016/0342977 A1 | 11/2016 | Lam |
| 2017/0061396 A1 | 3/2017 | Melika |
| 2017/0103390 A1 | 4/2017 | Wilson, Jr. et al. |
| 2017/0103458 A1 | 4/2017 | Pierce |
| 2017/0178237 A1 | 6/2017 | Wong |
| 2017/0228705 A1 | 8/2017 | Sandor et al. |
| 2018/0204191 A1 | 7/2018 | Wilson |

(Continued)

OTHER PUBLICATIONS

Amendments to Rules on Currency Deliveries, Exchange Notice, 12 pages, Mar. 11, 2014, ICE Futures U.S., Inc.

(Continued)

*Primary Examiner* — Hani M Kazimi
(74) *Attorney, Agent, or Firm* — Lempia Summerfield Katz LLC

(57) ABSTRACT

Systems and methods are disclosed for settling futures contracts that are based on virtual currencies. A clearing counter-party operates a clearing counter-party computer that may oversee physical delivery of virtual currency between a buyer and seller. The clearing counter-party computer does not take possession of the virtual currency and monitors a publicly viewable ledger to confirm that transactions have taken place.

22 Claims, 5 Drawing Sheets

(56) References Cited

U.S. PATENT DOCUMENTS

2018/0204192 A1 7/2018 Whaley

OTHER PUBLICATIONS

Coffee, Sugar & Cocoa Exchange, Inc. Guide, 6 pages, Jun. 1, 2002, New York Board of Trade, CCH Incorporated.
Contract Rules: ICE Futures Low Sulphur Gasoil Futures Contract, Section J1, 12 pages, Sep. 2011, ICE Futures Europe, https://www.theice.com/publicdocs/contractregs/15_SECTION_J1.pdf.
Contract Rules: ICE Futures White Sugar Futures Contract, Section IIII, 16 pages, Sep. 2014, ICE Futures Europe, https://www.theice.com/publicdocs/contractregs/107_SECTION_IIII.pdf.
Currency Rules, 21 pages, May 2014, ICE Futures U.S., Inc., https://www.theice.com/publicdocs/rulebooks/futures_us/16_Currencies.pdf.
Delivery Procedures, 159 pages, Jul. 2014, ICE Futures Europe, https://web.archive.org/web/20140707161633/https://www.theice.com/publicdocs/clear_europe/rulebooks/procedures/Delivery_Procedures.pdf.
Procedures: ICE Futures Low Sulphur Gasoil Futures Contract, Section K1, 12 pages, Sep. 2011, ICE Futures Europe, https://www.theice.com/publicdocs/contractregs/17%20SECTION%20K1.pdf.
Procedures: ICE Futures White Sugar Futures Contract, Section JJJJ, 8 pages, Sep. 2014, ICE Futures Europe, https://www.theice.com/publicdocs/contractregs/108_SECTION_JJJJ.pdf.
The Next Big Thing, 8 pages, May 9, 2015, The Economist, https://www.economist.com/news/special-report/21650295-or-it-next-big-thing.

SYSTEM FOR PHYSICALLY DELIVERING VIRTUAL CURRENCIES

REFERENCE TO RELATED APPLICATIONS

This application is a continuation under 37 C.F.R. § 1.53(b) of U.S. patent application Ser. No. 16/679,610 filed Nov. 11, 2019 now U.S. Pat. No. 11,514,522, which is a continuation under 37 C.F.R. § 1.53(b) of U.S. patent application Ser. No. 14/932,374 filed Nov. 4, 2015 now U.S. Pat. No. 10,504,178, the entire disclosures of which are hereby incorporated by reference and relied upon.

FIELD OF THE INVENTION

The present invention relates to systems for clearing derivative contracts based on virtual currencies and, in particular to systems that allow for the physical delivery of virtual currencies without the clearing counter-party directly possessing the virtual currencies.

DESCRIPTION OF THE RELATED ART

Common derivative contracts include futures and options contracts. Options are frequently traded via computer systems and methods. An option may be used to hedge risks by allowing parties to agree on a price for a purchase or sale of another instrument that will take place at a later time. One type of option is a call option. A call option gives the purchaser of the option the right, but not the obligation, to buy a particular asset either at or before a specified later time at a guaranteed price. The guaranteed price is sometimes referred to as the strike or exercise price. Another type of option is a put option. A put option gives the purchaser of the option the right, but not the obligation, to sell a particular asset at a later time at the strike price. In either instance, the seller of the call or put option can be obligated to perform the associated transactions if the purchaser chooses to exercise its option or upon the expiration of the option.

Futures contracts generally obligate buyers and sellers to purchase and sell an asset at a predetermined time and at a predetermined price. Assets may include physical commodities and financial instruments. Futures contracts can specify settlement either by physical delivery or by cash settlement. Settling a futures contract with physical delivery involves delivering the asset. For example, a quantity of corn may be delivered to a specific location. Settling a futures contract with cash settlement would involve making a cash payment corresponding to the value of the asset, e.g. the fair market value of a quantity of corn, in lieu of transferring the actual asset itself.

The U.S. Department of Treasury's Financial Crimes Enforcement Network (FinCEN) distinguishes between real and virtual currencies. FinCEN defines real currency as "the coin and paper money of the United States or of any country that [i] is designated as legal tender and that [ii] circulates and [iii] is customarily used and accepted as a medium of exchange in the country of issuance." FinCEN defines virtual currency as "a medium of exchange that operates like a currency in some environments, but does not have all the attributes of a real currency. In particular, virtual currency does not have legal tender status in any jurisdiction." FinCEN further defines a convertible virtual currency as virtual currency that "either has an equivalent value in real currency, or acts as a substitute for real currency." More specifically, convertible virtual currency may be bought and sold for legal tender.

The term cryptocurrency refers to a subset of virtual currencies that utilize cryptography for security purposes. Certain cryptocurrencies use a "proof of work" methodology to issue new units of currency. Other cryptocurrencies do not use a proof of work methodology, or use a proof of work methodology in combination with one or more other mechanisms to issue new units of currency. One example of a cryptocurrency is the Bitcoin virtual currency. The Bitcoin virtual currency is based on a cryptography technique in which transactions between parties on a peer-to-peer computer network are verified on a public ledger. The public ledger is also known as a block chain and is made up of a series of one or more digital blocks. Each party on the peer-to-peer network stores a copy of the block chain. When a financial transaction between parties takes place, it must be verified. New blocks are created as transactions are verified, and when new blocks are created, the block chain is updated to include the new block and, accordingly, to account for the new transaction.

The FinCEN Guidance further distinguished between "centralized" and "de-centralized" virtual currencies. A centralized convertible virtual currency is one that has a "centralized repository" akin to the way in which central banks of a nation are the sole issuer of real currency. A "de-centralized convertible virtual currency" is defined as one that "(1) has no central repository and no single administrator, and (2) that persons may obtain by their own computing or manufacturing effort." Bitcoin represents an example of a decentralized, convertible virtual currency.

As indicated above, some types of futures contracts are "physically" settled, i.e., the short counterparty agrees to deliver the actual commodity at final settlement. In some cases, the short may do so by literally providing the contract amount of the quantity to a location specified by the contract (e.g., delivery of crude oil to an oil terminal, delivery of grain to a grain elevator). In other cases, the short may deliver the contracted-for commodity by providing documents (e.g., warehouse receipts representing commodities in storage) or other evidence establishing that the contracted-for amount of the quantity has been provided (e.g., data confirming transfer of a note, bond, stock or other financial instrument to a specified account). Some physical settlements can involve transfer of money. For example, a foreign currency futures contract could require transfer of a contract amount of a foreign currency (e.g., Euros, Yen, etc.) at final settlement in return for payment of the contract price in a different currency (e.g., U.S. Dollars).

For each multi-laterally traded futures contract, there is generally a long counterparty and a short counterparty. Generally, however, either the long or the short of each such contract is an exchange clearinghouse or clearing counter-party (CCP). For example, a first counterparty may offer to sell a particular type of futures contract through an exchange. After the exchange publishes that offer, a second counterparty may purchase a futures contract of that type through the exchange at the offered price. The exchange then establishes a first contract in which the first counterparty is the short and the clearing counter-party is the long, and an offsetting second contract in which the second counterparty is the long and the clearing counter-party is the short, with the contract price of the first and second contracts (the accepted offer price of the first counterparty) being the same. The first and second counterparties may not know each other's identities.

The clearing counter-party provides financial safeguards in the form or financial guarantees or sureties that assures clearing members of the performance of contract obligations in the event of a default or other failure in the clearing process. In turn, clearing members provide some level of financial guarantee or surety to their customers to backstop their obligations. Typically, a clearing house will collect margins or other funds from its clearing members to assure performance of contractual obligations. Additionally, a clearing house may require that clearing members agree to post additional capital upon demand when needed (e.g., if there is a risk that another clearing member might default on its obligations). By doing this, a clearing house mutualizes the default or failure risk of its clearing members by aggregating funds to apply in the event of possible defaults or failures.

A clearing counter-party could facilitate physical delivery of virtual currency contracts by instructing the sellers of expiring contracts to transfer the virtual currencies directly to the clearing counter-party, and the clearing counter-party would then transfer the virtual currencies to the buyers.

Virtual currencies, such as Bitcoin, create challenges for clearing counter-parties. Virtual currencies can be transferred pseudonymously. And transactions in virtual currencies often lack recourse, e.g. they cannot be reversed without the consent of the recipient. As such, computer security breaches or employee dishonesty could result in loss of virtual currency assets without the ability to recover them. Holding virtual currency assets for settlement of derivatives contracts at a clearing counter-party presents a tempting target for thieves. Storage of virtual currency assets carries unique risks and requires specialized security procedures.

There is a need in the art for improved systems and methods for clearing derivative contracts based on virtual currencies while minimizing risks to clearing counter-parties.

SUMMARY OF THE INVENTION

Embodiments of the present invention overcome problems and limitations of the prior art by providing systems and methods that allow a clearing counter party to confirm that virtual currency has been physically delivered without taking possession of the virtual currency.

In some embodiments a clearing counter-party computer is configured to provide settlement instructions to buyer and seller computers. The instructions provide for the direct transfer of virtual currency between the buyer and seller computers. The clearing counter-party computer may then access a publicly viewable ledger to confirm that the seller computer transferred virtual currency to the buyer computer. Some alternative embodiments use a trusted depository to hold virtual currency.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION OF THE INVENTION

Figure 1:
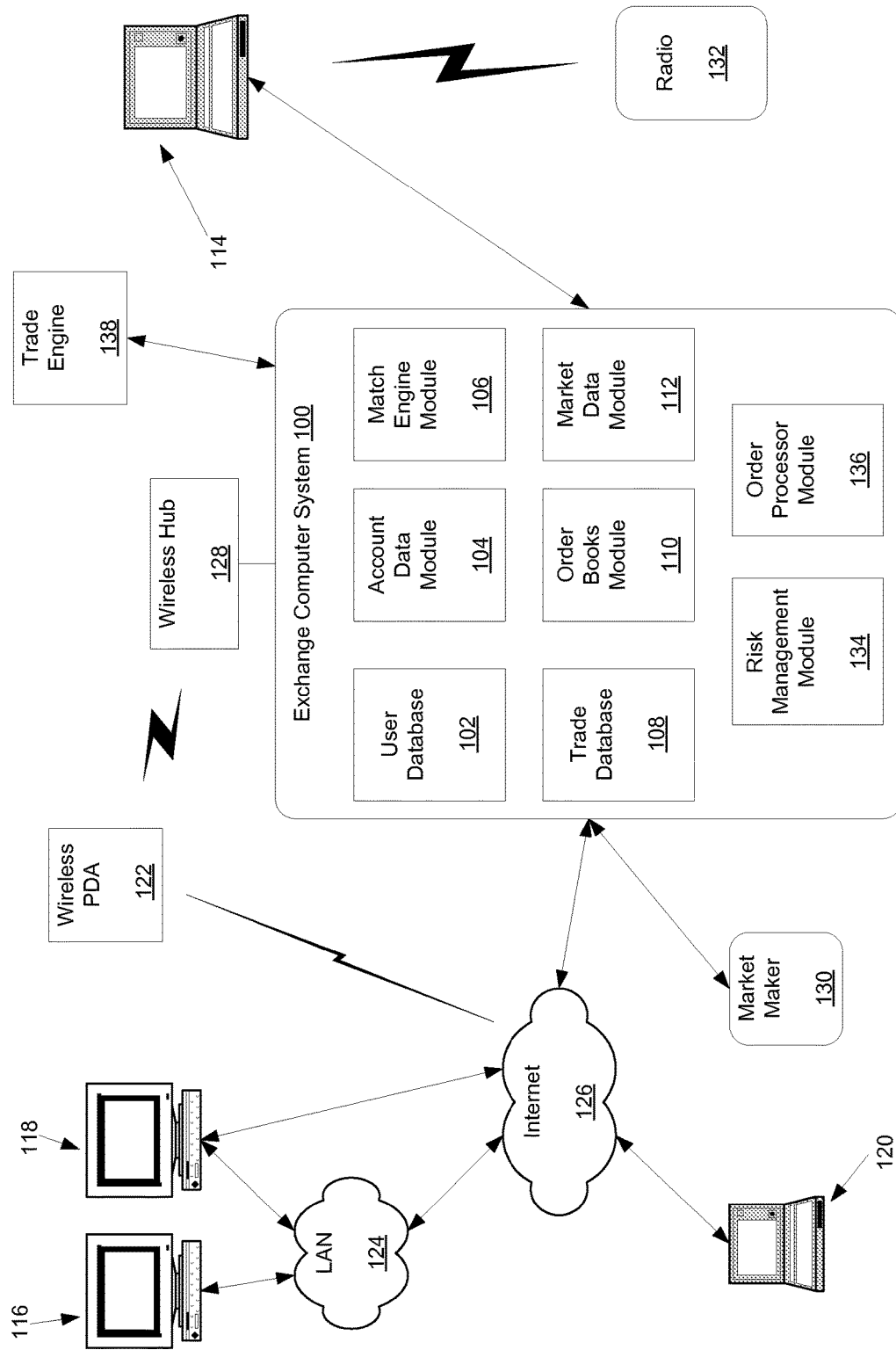
FIG. 1 shows a computer network system that may be used to implement aspects of the present invention.

Aspects of the present invention may be implemented with computer devices and computer networks that allow users to perform calculations and exchange information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords potentially with other information to identify users uniquely or collectively. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose variable defined derivative product and aggregate order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on a computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
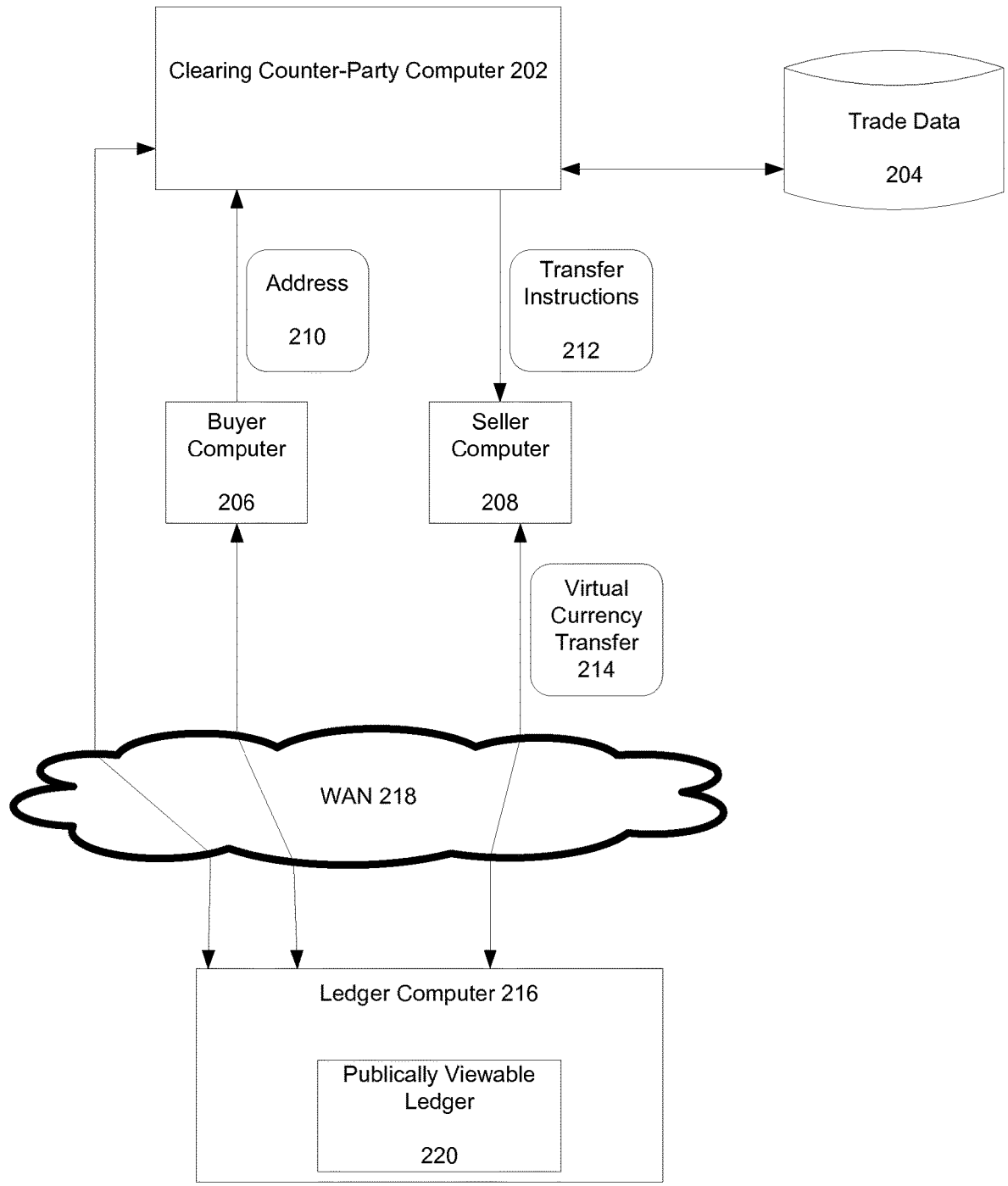
FIG. 2 shows a system that may be used to clear futures contracts in accordance with an embodiment of the invention.

FIG. 2 shows a system that may be used to clear futures contracts in accordance with an embodiment of the invention. The futures contracts may include virtual currency futures contracts. A clearing counter-party computer 202 may include a processor and a computer-readable medium that stores computer-executable instructions. Clearing counter-party computer 202 also include other conventional components, such as a network interface card or a motherboard configured to communicate with a computer network.

Clearing counter-party computer 202 may communicate with a collection of trade data 204. Collection of trade data 204 may identify buyers and sellers and terms of futures contracts. The terms of the futures contracts may include expiration dates and delivery requirements. Collection of trade data 204 may be arranged in a database and may be stored within clearing counter-party computer 202.

Clearing counter-party computer 202 may be connected to a buyer computer 206 and a seller computer 208. Buyer computer 206 may be used by a buyer of a futures contract and seller computer 208 may be used by a seller of a futures contract. In some embodiments counter-party computer 202 may communicate with buyer computer 206 and seller computer 208 via one or more secure channels. The secure channels may be encrypted and may use a private network in one embodiment or a public network, such as the Internet in other embodiments.

Clearing counter-party computer 202 may be configured to clear futures contracts based on virtual currencies without taking possession of the virtual currencies. In some embodiments clearing counter-party computer 202 may determine when a futures contract expires and requests a virtual currency address 210 from buyer computer 206. Address 210 may be a wallet address. After receiving address 210, clearing counter-party computer 202 may send transfer instructions 212 to seller computer 208. Transfer instructions 212 may include address 210 and any other instructions for seller computer 208 to transfer virtual currency to a buyer.

In some embodiments seller computer 208 may transfer virtual currency by sending a virtual currency transfer request 214 to a ledger computer 216. Seller computer 208 may communicate with ledger computer 216 via a wide area network (WAN) 218, such as the Internet, or some other network. Ledger computer 216 may maintain a publicly viewable ledger 220 that lists virtual currency transfers. Those skilled in the art will appreciate that ledger computer 216 may be implemented with multiple interconnected computers and that buyer computer 206 and seller computer 208 may communicate with different ones of the interconnected computers. When the virtual currency is Bitcoin, the publicly viewable ledger is the blockchain. Clearing counter-party computer 202 and buyer computer 206 may be configured to analyze publicly viewable ledger 220 to confirm that address 210 received the virtual currency identified in the futures contract.

Figure 3:
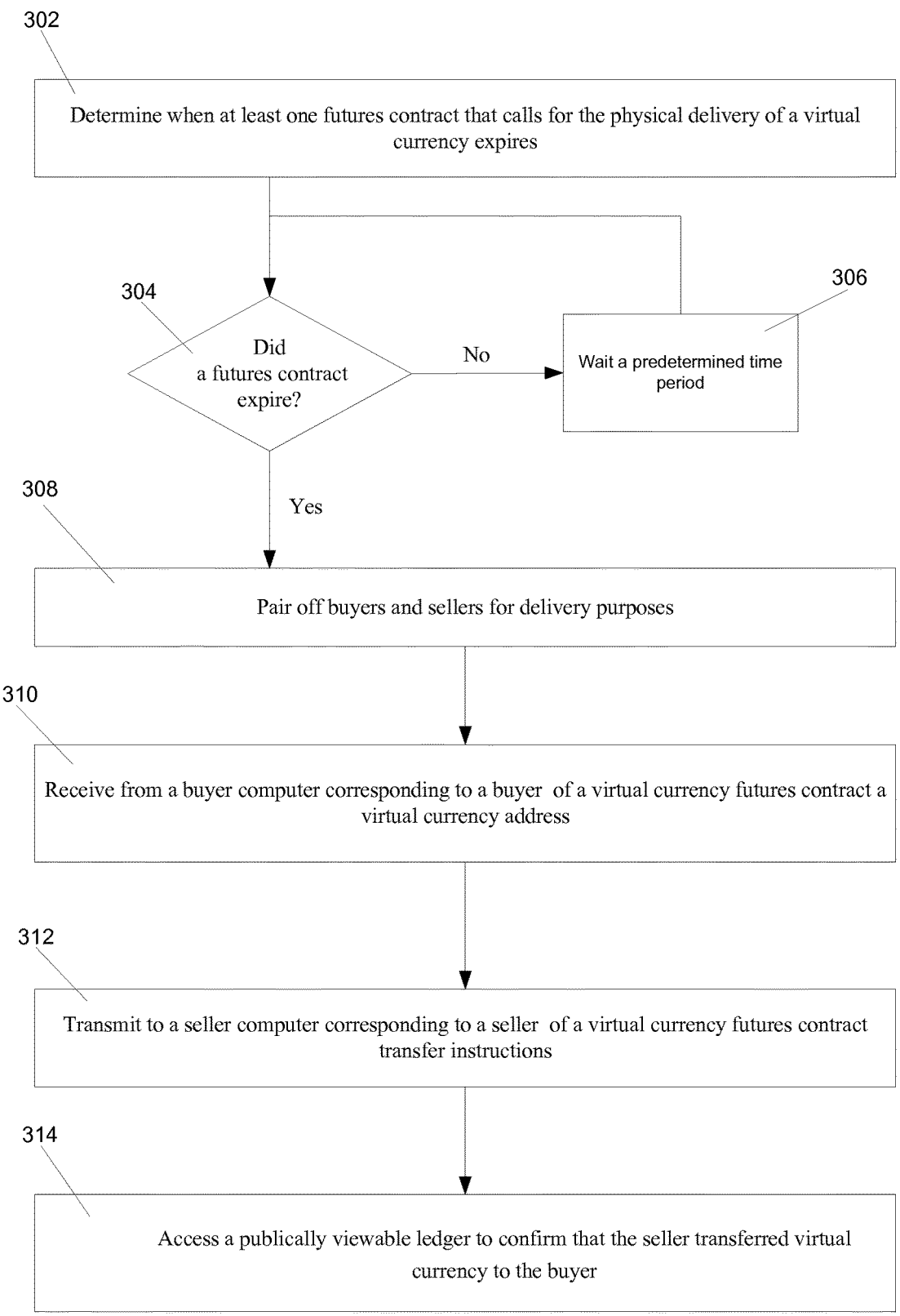
FIG. 3 shows a computer implemented method that may be implemented by a clearing counter-party computer or other computer device to clear futures contracts based on virtual currencies in accordance with an embodiment of the invention.

FIG. 3 shows a computer implemented method that may be implemented by a clearing counter-party computer or other computer device to clear futures contracts based on virtual currencies in accordance with an embodiment of the invention. First, in step 302 it is determined when at least one futures contract that calls for the physical delivery of a virtual currency expires. Step 302 may include analyzing trade data stored in a collection or database. Next, in step 304 it is determined if a futures contract has expired. If no contract has expired, the process waits a predetermined time period in step 306 and then returns to step 304. When a futures contract has expired, in step 308 buyers and sellers are paired off for delivery purposes. Step 308 may include matching buyers and sellers and quantities.

After buyers and sellers are paired off, in step 310 a virtual currency address is received from a buyer computer. The buyer computer may correspond to a buyer of a virtual currency futures contract. Step 310 may include a clearing counter-party computer requesting a virtual currency address. In some embodiments the virtual currency address is a Bitcoin wallet address. Next, in step 312, transfer instructions are sent to a seller computer. The transfer instructions include details for transferring virtual currency and may include the virtual currency address. The seller computer may correspond to a seller of a virtual currency futures contract. In step 314 a publicly viewable ledger may be accessed to confirm that the seller transferred virtual currency to the buyer. Step 314 may include accessing the Bitcoin blockchain and confirming that bitcoin was transferred to a Bitcoin wallet address, such as the address received in step 310.

The system represented in FIG. 2 and the method shown in FIG. 3 involve a single buyer being paired off with a single seller. Other embodiments may include a single buyer and multiple sellers or multiple buyers and a single seller. When multiple sellers are involved, the process used by a clearing counter-party computer may be modified to ensure that the required virtual currency is delivered. Some virtual currencies, such as Bitcoin, employ pseudonymity, such that the identity of parties who transferred virtual currency to a given address may not be transparent.

Figure 4:
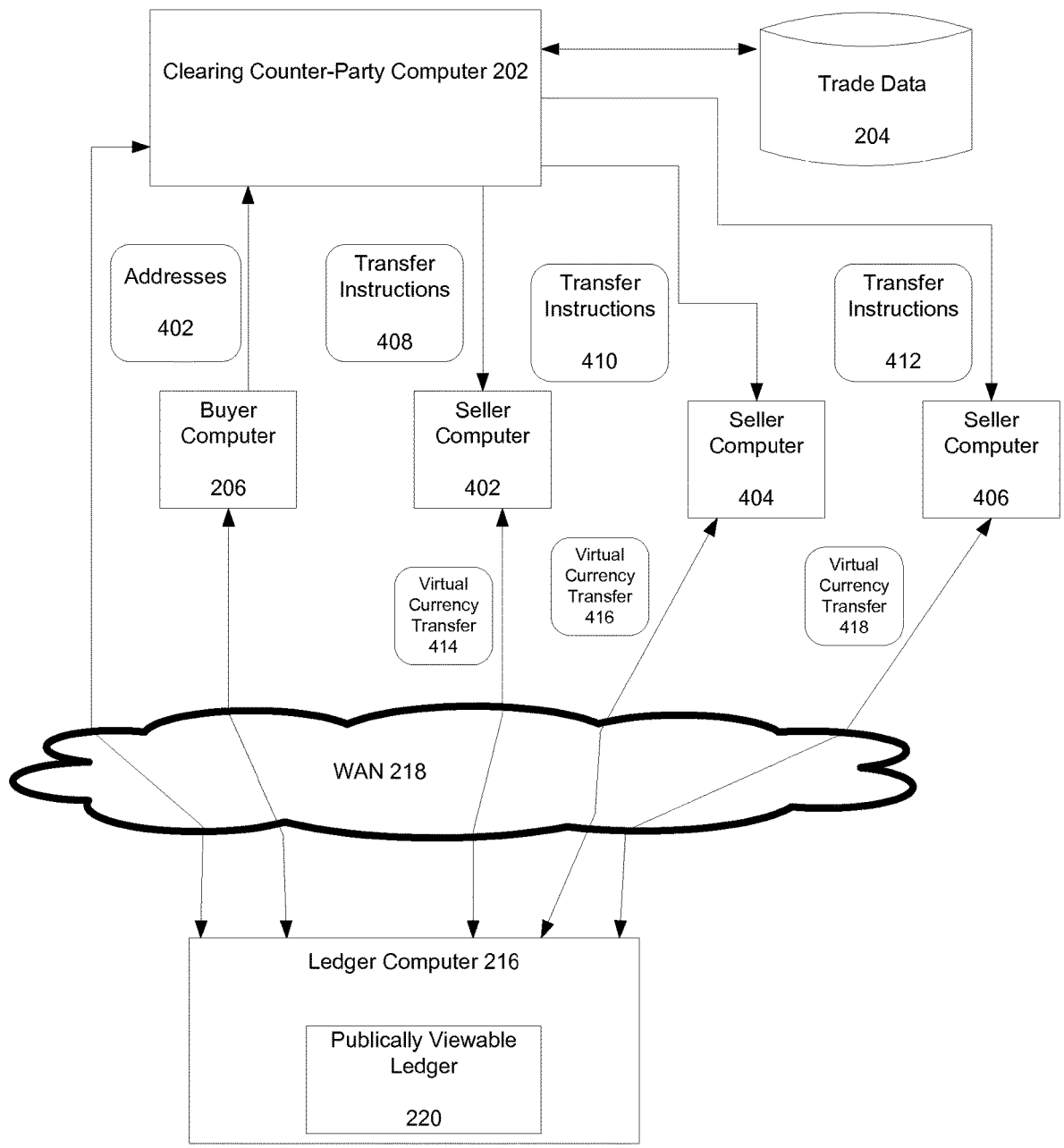
FIG. 4 shows a system that may be used to clear futures contracts based on virtual currencies and that involve a single buyer and multiple sellers, in accordance with an embodiment of the invention.

FIG. 4 shows a system that may be used to clear futures contracts based on virtual currencies and that involve a single buyer computer 206 and multiple seller computers 402, 404 and 406, in accordance with an embodiment of the invention. A situation in which a single buyer is paired off with multiple sellers may exist when a buyer buys a quantity of virtual currency that matches a combined quantity of virtual currency sold by multiple sellers. In order to confirm that each seller ultimately transfers the required virtual currency, clearing party computer 202 receives from buyer computer 206 a unique virtual currency address for use by each of the multiple seller computers 402, 404 and 406. Clearing counter-party computer 202 may send transfer instructions 408, 410 and 412 to seller computers 402, 404 and 406. Transfer instructions 408, 410 and 412 are unique and include a unique virtual currency address for use by each seller computer.

Seller computers 402, 404 and 406 may transfer virtual currency by sending virtual currency transfer requests 414, 416 and 418 to ledger computer 216. Clearing counter-party computer 202 and buyer computer 206 may confirm that the required transfers have taken place by analyzing the publicly viewable ledger 220. In particular, clearing counter-party computer 202 can determine when virtual currency has not been delivered to one of the unique addresses and associate that unique address with a seller and seller computer.

In alternative embodiments of the invention, clearing counter-party party computer 202 may use other mechanisms to ensure that multiple seller computers have all delivered the required virtual currency such that the buyer computer 206 need only provide one virtual currency address. Some virtual currencies require the use of a private key when sending virtual currency. When it appears that one or more seller computers has not delivered the required virtual currency to a shared address provided by buyer computer 206, clearing counter-party party computer 202 can require each of the seller computers to confirm that they possess a private key used in a transactions. Clearing counter-party party computer 202 could also require the seller computers to transfer a different minimal amount of virtual currency to a third party to confirm that they possess the private key used in the original transaction. The clearing counter-party would then be able to determine which seller or sellers failed to deliver the required virtual currency to the buyer.

In some embodiments, clearing counter-party computer 202 could also require seller computers to use a transaction identifier that is viewable in the publicly viewable ledger when transferring virtual currency. Clearing counter-party computer 202 could then associate transactions viewable in the publicly viewable ledger with seller computers and identify any missing transactions. Alternatively, if the virtual currency allows for the use of a sender address, clearing counter-party party computer 202 could use a unique sender address to confirm that the publicly viewable ledger includes required transactions from each sender to the buyer.

Some virtual currency transfers are irrevocable. The settlement of a futures contract may call for the delivery of real currency and virtual currency. For example, a first party may deliver real currency and a second party may deliver virtual currency. In order to minimize exposure to the clearing counter-party, a clearing counter-party computer may require the party receiving virtual currency to maintain the amount of real currency in a margin account or other account. After the clearing counter-party computer determines that the virtual currency has been transferred by the second party, the clearing counter-party computer may then transfer the real currency to the second party. This embodiment reduces risk to sellers of virtual currency and clearing counter-parties.

Some virtual currency networks may allow transactions of real currency and virtual currency to be effected as a single atomic transaction, where both the virtual currency and the real currency, or digital representations of them, are exchanged simultaneously. Such a system would remove any risk of one-sided exchange. A clearing counter-party computer may use such a system to provide delivery instructions to buyers and sellers. For example, at settlement, a clearing counter-party computer may obtain virtual currency addresses from buyers and sellers and instruct a buyer to purchase virtual currency from a seller address. The clearing counter-party computer may also instruct the seller to expect the transaction as part of the settlement process. The clearing counter-party computer may confirm that the transaction took place by analyzing the publicly viewable ledger.

Some embodiments of the invention may use a trusted depository or vault to hold virtual currency. The use of a trusted depository or vault allows a clearing counter-party to participate in the settlement process without taking possession of virtual currency. This mechanism is efficient in part because it does not require a clearing counter-party to maintain required storage security procedures. A trusted depository or vault may specialize in secure storage of virtual currency and can implement specialized security procedures, and can continuously improve procedures to address new threats.

Figure 5:
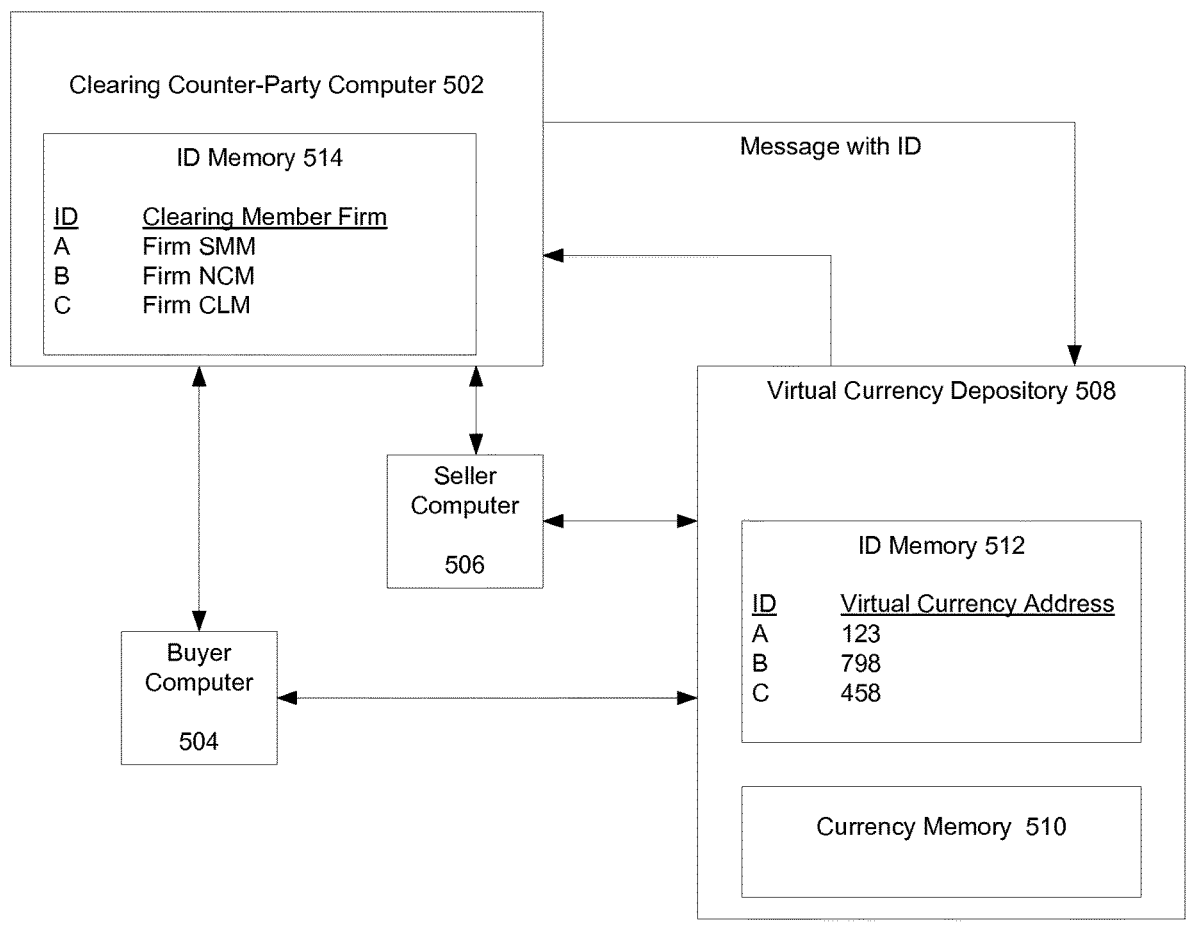
FIG. 5 shows a system that may be used during the settlement of futures contracts that are based on virtual currencies, in accordance with an embodiment of the invention.

FIG. 5 shows a system that may be used during the settlement of futures contracts that are based on virtual currencies, in accordance with an embodiment of the invention. A clearing counter-party computer 502 communicates with a buyer computer 504 and a seller computer 506. Clearing counter-party computer 502, buyer computer 504 and seller computer 506 may all be configured to communicate with a virtual currency depository 508. One or more of the communication channels may be secure and/or encrypted. Virtual currency depository 508 may include one or more memories, such as currency memory 510 for storing virtual currency. Virtual currency depository 508 may also include an ID memory 512 that associates unique identification codes with virtual currency addresses. Clearing counter-party computer 502 may include an ID memory 514 that associates the unique identification codes with clearing member firms. The use of a unique identification code allows clearing counter-party computer 502 to communicate with virtual currency depository 508 without knowing any of the virtual currency addresses. This configuration reduces security risks and allows clearing counter-party computer 502 to ensure delivery without monitoring the blockchain.

Clearing counter-party computer 502 may use the unique identification codes to query the virtual currency depository 508 to ensure the buyer and seller firm accounts exist (i.e. the depository has wallets for both the buyer and the seller). Clearing counter-party computer 502 may also query the depository for a firm's balance to ensure sufficient virtual currency is on deposit prior to assignment. In some embodiments, clearing counter-party computer can inform virtual currency depository 508 that a certain amount of virtual currency from the selling firm should be held on reserve as the seller will be required to deliver it shortly.

During settlement, clearing counter-party computer 502 can pair off buyers and sellers for delivery purposes. Clearing counter-party computer 502 may then instruct virtual currency depository 508 to transfer virtual currency from the seller's ID to the buyer's ID, and virtual currency depository 508 can provide a confirmation to clearing counter-party computer 502 when the transfer has been completed. Finally, clearing counter-party computer 502 may adjust the buyer's/seller's positions to designate the transfer as complete.

When multiple contracts are involved, clearing counter-party computer 502 may net the total obligations of the clearing participants, which includes buyers, sellers, and clearing participants who have both bought and sold, and instruct virtual currency depository 508 to move the net amount of virtual currency between each clearing participant. In an alternative embodiment, clearing counter-party computer 502 would not net the total obligations and would instruct virtual currency depository 508 to make every transaction so that there is a record of all of the transactions.

Virtual currency depository 508 may hold virtual currency in a non-segregated manner or in a segregated manner. When virtual currency is held in a non-segregated manner, virtual currency transfers to the depository may be made to a virtual currency address of the depository. When virtual currency is held in a segregated manner, virtual currency transfers may be sent to and from individual virtual currency addresses that correspond to the unique identification codes. Alternatively, virtual currency addresses may belong to individual buyers or sellers, or a clearing counter-party may have multiple virtual currency addresses.

In some embodiments, to eliminate or reduce the risk of loss or theft, the rules of engagement between a clearing counter-party, a virtual currency depository, and the clearing participants, such as buyers and sellers, can specify that the depository is only allowed to transfer virtual currency between designated participants within an ecosystem approved by the depository and the clearing counter-party, i.e. only clearing participants of the clearing counter-party with wallets at the depository. The virtual currency depository would decline to honor any requests to transfer virtual currency to any party outside of this closed ecosystem, except that it would permit each participant to withdraw virtual currency to wallets that the depository has verified are controlled by the participant making the withdrawal. This creates an extra layer of protection that ensures the virtual currency depository would not inadvertently transfer virtual currency to an external address.

The systems described above allows for the efficient clearing of virtual currency futures contracts. Clearing counter-party computers never takes possession of virtual currencies, so risks are not concentrated. The systems described above also allow clearing counter-party computers to confirm that virtual currency transfers have taken place.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention.

The invention claimed is:

1. A system comprising:
a clearing counter-party computer in communication with
a buyer computer corresponding to a buyer obligated per a first virtual currency futures contract to take physical delivery, upon an associated expiration date, of a first quantity of a virtual currency and a seller computer corresponding to a seller obligated per a second virtual currency futures contract to make physical delivery, upon an associated expiration date, of a second quantity of the virtual currency, the virtual currency being transacted via a publicly viewable electronic ledger also in communication with the clearing counter-party computer, and wherein the clearing counter-party computer comprises a computer-readable medium that contains computer-executable instructions that cause the clearing counter-party computer, without the clearing counter-party taking actual possession of the virtual currency, to:
determine that both the first and second futures contracts have expired;
receive, based on the determined expiration, a virtual currency address from the buyer computer;
direct the seller computer to transfer, via the publicly viewable electronic ledger, an amount of the virtual currency to the received virtual currency address, and further direct the seller computer to include in the transfer a unique identifier having an association known by the clearing counter-party computer with the directed transfer and which, when included with the transfer, will be viewable in the publicly viewable electronic ledger in association therewith; and
confirm, via the publicly viewable electronic ledger, that the seller transferred the amount of the virtual currency via a determination that the publicly viewable electronic ledger includes the unique identifier.

2. The system of claim 1, wherein the first and second virtual currency futures contracts are the same virtual currency futures contract.

3. The system of claim 1, wherein the clearing counter-party computer does not identify the buyer and seller to each other.

4. The system of claim 1, wherein the unique identifier comprises the amount of the virtual currency to be physically delivered to the buyer.

5. The system of claim 1, further including a secure channel for receiving the virtual currency address from the buyer computer and/or directing the seller computer.

6. The system of claim 1, wherein the virtual currency address comprises at least one wallet address.

7. The system of claim 1, wherein the publicly viewable electronic ledger is maintained by one or more ledger computers in communication with the clearing counter-party computer.

8. The system of claim 1, wherein the virtual currency comprises Bitcoin.

9. The system of claim 1 wherein the computer-executable instructions further cause the clearing counter-party computer to reduce the quantity of the virtual currency to be physically delivered to the buyer by an amount the buyer is obligated to deliver to another buyer per another futures contract determined to be expired and per which the buyer is a seller.

10. A clearing counter-party computer in communication with buyer and seller computers and a publicly viewable electronic ledger via which a virtual currency is transacted, the clearing counter-party computer comprising a processor and a memory coupled therewith, the memory storing computer-executable instructions that when executed by the processor, cause the processor, without the clearing counter-party taking actual possession of any virtual currency, to:

determine that both first and second futures contracts have expired, the first futures contract comprising an obligation of a buyer, associated with the buyer computer, to take physical delivery, upon expiration date, of a first quantity of a virtual currency, the second futures contract comprising an obligation of a seller, associated with the seller computer, to make physical delivery, upon expiration, of a second quantity of the virtual currency;

receive, based on the determined expiration, from the buyer computer, a designation identifying where the seller computer is to transfer an amount of the virtual currency, and communicate the received designation thereto along with a unique identifier having an association with the transfer known by the clearing counter-party computer and which, when included as part of the transfer, will be viewable in the publicly viewable electronic ledger in association therewith; and confirm, via the publicly viewable electronic ledger, that the seller transferred the amount of the virtual currency via a determination that the publicly viewable electronic ledger includes the unique identifier.

11. The system of claim 10, wherein the first and second futures contracts are the same futures contract.

12. The system of claim 10, wherein the clearing counter-party computer does not identify the buyer and seller to each other.

13. The system of claim 10, wherein the unique identifier comprises the amount of the virtual currency to be physically delivered to the buyer.

14. The system of claim 1, further including a secure channel for receiving the virtual currency address from the buyer computer and/or directing the seller computer.

15. The system of claim 1, wherein the virtual currency address comprises at least one wallet address.

16. The system of claim 1, wherein the publicly viewable electronic ledger is maintained by one or more ledger computers in communication with the clearing counter-party computer.

17. The system of claim 1, wherein the virtual currency comprises Bitcoin.

18. The system of claim 1 wherein the computer-executable instructions further cause the clearing counter-party computer to reduce the quantity of the virtual currency to be physically delivered to the buyer by an amount the buyer is obligated to deliver to another buyer per another futures contract determined to be expired and per which the buyer is a seller.

19. A computer implemented method comprising:

determining, by a clearing counter-party computer in communication with buyer and seller computers and a publicly viewable electronic ledger via which a virtual currency is transacted, that both first and second futures contracts have expired, the first futures contract comprising an obligation of a buyer, associated with the buyer computer, to take physical delivery, upon expiration date, of a first quantity of a virtual currency, the second futures contract comprising an obligation of a seller, associated with the seller computer, to make physical delivery, upon expiration, of a second quantity of the virtual currency;

receiving, by the clearing counter-party computer based on the determined expiration, from the buyer computer, a designation identifying where the seller computer is to transfer an amount of the virtual currency, and communicating the received designation thereto along with a unique identifier having an association with the transfer known by the clearing counter-party computer and which, when included as part of the transfer, will be viewable in the publicly viewable electronic ledger in association therewith; and confirming, by the clearing counter-party computer via the publicly viewable electronic ledger, that the seller transferred the amount of the virtual currency via a determination that the publicly viewable electronic ledger includes the unique identifier.

20. The computer implemented method of claim 19, wherein the first and second futures contracts are the same futures contract.

21. The computer implemented method of claim 19, wherein the clearing counter-party computer does not identify the buyer and seller to each other.

22. The computer implemented method of claim 19, wherein the unique identifier comprises the amount of the virtual currency to be physically delivered to the buyer.

* * * * *

UNITED STATES PATENT AND TRADEMARK OFFICE
CERTIFICATE OF CORRECTION

PATENT NO. : 12,346,964 B2
APPLICATION NO. : 17/973625
DATED : July 1, 2025
INVENTOR(S) : Ryan Pierce, Sandra Ro and Mansoor Ahmed It is certified that error appears in the above-identified patent and that said Letters Patent is hereby corrected as shown below:

In the Claims

Column 10, Claim 1, Line 17:
Please add "occurrence of" after "upon"

Column 10, Claim 1, Line 21:
Please add "occurrence of" after "upon"

Column 10, Claim 1, Line 33:
Please add "of the first and second futures contracts" after "expiration"

Column 11, Claim 10, Line 19:
Please delete "date" and replace with "of the first futures contract"

Column 11, Claim 10, Line 23:
Please add "of the second futures contract" after "expiration"

Column 11, Claim 11, Line 38:
Please delete "system" and replace with "clearing party computer"

Column 11, Claim 12, Line 40:
Please delete "system" and replace with "clearing party computer"

Column 11, Claim 13, Line 43:
Please delete "system" and replace with "clearing party computer"

Signed and Sealed this
Twenty-fifth Day of November, 2025

John A. Squires
*Director of the United States Patent and Trademark Office*

CERTIFICATE OF CORRECTION (continued)
U.S. Pat. No. 12,346,964 B2

Column 11, Claim 14, Line 46:
Please delete "system" and replace with "clearing party computer"
Please add a "0" after the number "1"

Column 11, Claim 15, Line 49:
Please delete "system" and replace with "clearing party computer"
Please add a "0" after the number "1"

Column 12, Claim 16, Line 1:
Please delete "system" and replace with "clearing party computer"
Please add a "0" after the number "1"

Column 12, Claim 17, Line 5:
Please delete "system" and replace with "clearing party computer"
Please add a "0" after the number "1"

Column 12, Claim 18, Line 7:
Please delete "system" and replace with "clearing party computer"
Please add a "0" after the number "1"

Column 12, Claim 19, Line 22:
Please delete "date" and replace with "of the first futures contract"

Column 12, Claim 19, Line 25:
Please add "of the second futures contract" after "expiration"